(12) United States Patent
Ngan

(10) Patent No.: US 7,542,733 B1
(45) Date of Patent: Jun. 2, 2009

(54) METHOD AND APPARATUS FOR DIVERSITY TRANSMISSION FROM A MOBILE STATION

(75) Inventor: John Cheong-Wai Ngan, Shawnee, KS (US)

(73) Assignee: Sprint Spectrum L.P., Overland Park, KS (US)

(*) Notice: Subject to any disclaimer, the term of this patent is extended or adjusted under 35 U.S.C. 154(b) by 441 days.

(21) Appl. No.: 10/358,591

(22) Filed: Feb. 4, 2003

(51) Int. Cl.
*H03C 7/02* (2006.01)
*H04B 1/02* (2006.01)
*H04B 7/02* (2006.01)

(52) U.S. Cl. ............... 455/101; 455/127.3; 455/253.2; 455/311; 455/144; 375/297; 375/299; 375/295; 375/222

(58) Field of Classification Search ............... 455/101, 455/78, 95, 115.1, 134, 108, 103, 114.3, 455/127.3, 253.2, 127.2, 522, 69, 550.1, 455/553.1, 561; 370/252, 334; 375/267
See application file for complete search history.

(56) References Cited

U.S. PATENT DOCUMENTS

| | | | | |
|---|---|---|---|---|
| 5,901,345 A * | 5/1999 | Ikeda et al. | ............... | 455/114.3 |
| 6,002,672 A * | 12/1999 | Todd | ............... | 370/252 |
| 6,021,317 A * | 2/2000 | Irvin | ............... | 455/78 |
| 6,023,615 A * | 2/2000 | Bruckert et al. | ............... | 348/14.08 |
| 6,026,132 A * | 2/2000 | Ziesse | ............... | 375/347 |
| 6,327,299 B1 * | 12/2001 | Meszko | ............... | 375/149 |
| 6,473,600 B1 * | 10/2002 | Dvorkin | ............... | 455/129 |
| 6,611,679 B1 * | 8/2003 | Park et al. | ............... | 455/245.1 |
| 6,625,208 B2 * | 9/2003 | Hindie et al. | ............... | 375/222 |
| 6,859,643 B1 * | 2/2005 | Ma et al. | ............... | 455/101 |
| 7,113,748 B2 * | 9/2006 | Shapira et al. | ............... | 455/63.4 |
| 7,149,489 B2 * | 12/2006 | Hong | ............... | 455/269 |
| 7,392,019 B2 * | 6/2008 | Hiramatsu et al. | ............... | 455/101 |
| 7,450,917 B2 * | 11/2008 | Kim et al. | ............... | 455/127.5 |
| 2003/0139152 A1 * | 7/2003 | Doi et al. | ............... | 455/101 |
| 2003/0190903 A1 * | 10/2003 | Melamed | ............... | 455/277.1 |
| 2004/0092235 A1 * | 5/2004 | Li et al. | ............... | 455/101 |
| 2004/0192233 A1 * | 9/2004 | Mitzlaff | ............... | 455/127.1 |
| 2004/0203541 A1 * | 10/2004 | Coan et al. | ............... | 455/115.1 |
| 2004/0252779 A1 * | 12/2004 | Rouquette et al. | ............... | 375/267 |
| 2007/0049348 A1 * | 3/2007 | O'Sullivan et al. | ............... | 455/562.1 |
| 2007/0111678 A1 * | 5/2007 | Viswanath et al. | ............... | 455/101 |

OTHER PUBLICATIONS

Alamouti, Siavash M., "A Simple Transmit Diversity Technique for Wireless Communications," *IEEE Journal on Select Areas in Communications* 16#(No. 8):pp. 1451-1458(1998).

(Continued)

*Primary Examiner*—Alexander Eisen
*Assistant Examiner*—Huy Phan

(57) ABSTRACT

A method and system for diversity transmission from a mobile station. Signals sent from a mobile station to a base station may suffer from fading. To combat this, diversity transmission is used to compensate for the effects of fading and destructive multi-path interference by sending two or more signals. Signals to be transmitted from the mobile station are split into a first split signal and a second split signal and diversified from one another. Diversification of the split signals may be accomplished by modifying the phase of either the first split signal, the second split signal or both the first and second split signal. The diversified signals may then be transmitted from a first and second antenna.

7 Claims, 6 Drawing Sheets

OTHER PUBLICATIONS

Chheda, et al., "Performance Evaluation of Two Transmit Diversity Techniques for cdma2000," *Presented at 1999 Wireless Communications and Networking Conference*, Sep. 21-24, 1999, New Orleans, LA, U.S.A.

Dolmans, G., "An Adaptive Mobile Antenna System for Wireless Applications," *Perspectives on Radio Astronomy—Technologies for Large Antenna Arrays—Netherlands Foundation for Research in Astronomy* (1999).

Paulraj, A., "Diversity Techniques," *The Communications Handbook*, Chapter 17:pp. 213-223 (1997).

PCMCIA Network Adapters, http://www.roadrunnerwireless.com/pcmciaAdapters.htm.

Rowell, Erica D., "Upping the Ante(nna) Duel Antennas in Cell Phones Could Help Reception," ABCNEWS.com http://abcnews.go.com/sections/tech/CuttingEdge/cuttingedge000505.htm (2001).

Tsai, et al., "Performance of Antenna Diversity Combining for OFDM-CDMA Systems in Ground-Based Communications," *IEEE* (2002) Presented at MILCOM Military Communications Conference 2002, Oct. 7-10, 2002, Anaheim, CA, U.S.A.

Wrolstad, Jay, "Motorola Mulls Multiple Antennas for 3G," Newsfactor.com http://www.newsfactor.com/perl/story/17933.html (2002).

* cited by examiner

METHOD AND APPARATUS FOR DIVERSITY TRANSMISSION FROM A MOBILE STATION

BACKGROUND

1. Field of the Invention

The present invention relates generally to the field of wireless telecommunications and more particularly to wireless telecommunication using diversity transmission.

2. Description of Related Art

Wireless mobile stations, such as PCS and cellular telephones, WAP-enabled communication devices, personal digital assistants, IEEE 802.11 stations, cordless telephones, pagers, personal digital assistants (PDAs), two-way mobile radios (e.g. FRS-band radios), portable messaging devices (e.g., "Blackberry" devices) and wireless computers, have become widely used in society today. Suitably equipped, such a mobile station may connect a user to a network over an air interface, thereby enabling the user to engage in many useful voice and data communications without the need for a landline connection.

The mobile station will communicate over the air interface with a base transceiver station, which in turn transmits the signal to a base station controller. Due to noise limited conditions, the signal transmitted from the mobile station may fade on route to the base transceiver station, making it impossible for the base transceiver station to interpret the transmitted signal. To combat the signal fading, mobile stations typically increase the power level of the transmitter. This increase in power protects the transmitted signal during periods where the transmitted signal may be severely faded. However, increasing the transmit power level is an impractical solution in the context of a mobile station. Mobile stations have very limited power capabilities due to battery constraints, in turn limiting the ability to boost the power level in a transmitted signal to an adequate level.

SUMMARY

In accordance with an exemplary embodiment of the present invention, a mobile station will use diversity transmission in order to transmit communication signals over the air interface. Advantageously, diversity transmission from the mobile station can help compensate for, or reduce, the effects of fading. In particular, diversity transmission from the mobile station may compensate for the effects of pathloss fading and destructive multi-path interference by sending two or more signals.

The transmit signal may be separated or split into two or more signals. The separated signals may be differentiated from one another. And, the two or more differentiated signals may be sent from the mobile station. Differentiation of the signals may be accomplished in a variety of ways. In one illustrative embodiment, the signals are differentiated by modifying the phase of one, some or all of the split signals. As merely one example, one of the split signals may be modified by a constant phase shift. In another illustrative embodiment, the signals are differentiated by delaying at least one, some or all of the split signals. The differentiated signals may then be transmitted from at least two antennas.

Alternatively or additionally, the antennas for transmitting the differentiated signals may be used to receive and transmit signals. To facilitate transmitting and receiving on a single antenna, a bi-directional coupler, such as duplexer may be used.

These as well as other features and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION

Diversity transmission from the mobile station may be used to improve communication from a mobile station to a base station in a public or private wireless network. The wireless network may take any of a variety of forms. By way of example, the wireless network may be a CDMA network (and/or a cdma2000 or 3G network), such as a Sprint PCS network, or an AMPS, TDMA or GSM network. Alternatively, the network may operate according to the IEEE 802.11b standard. Other examples known now or later developed are also possible.

Figure 1:
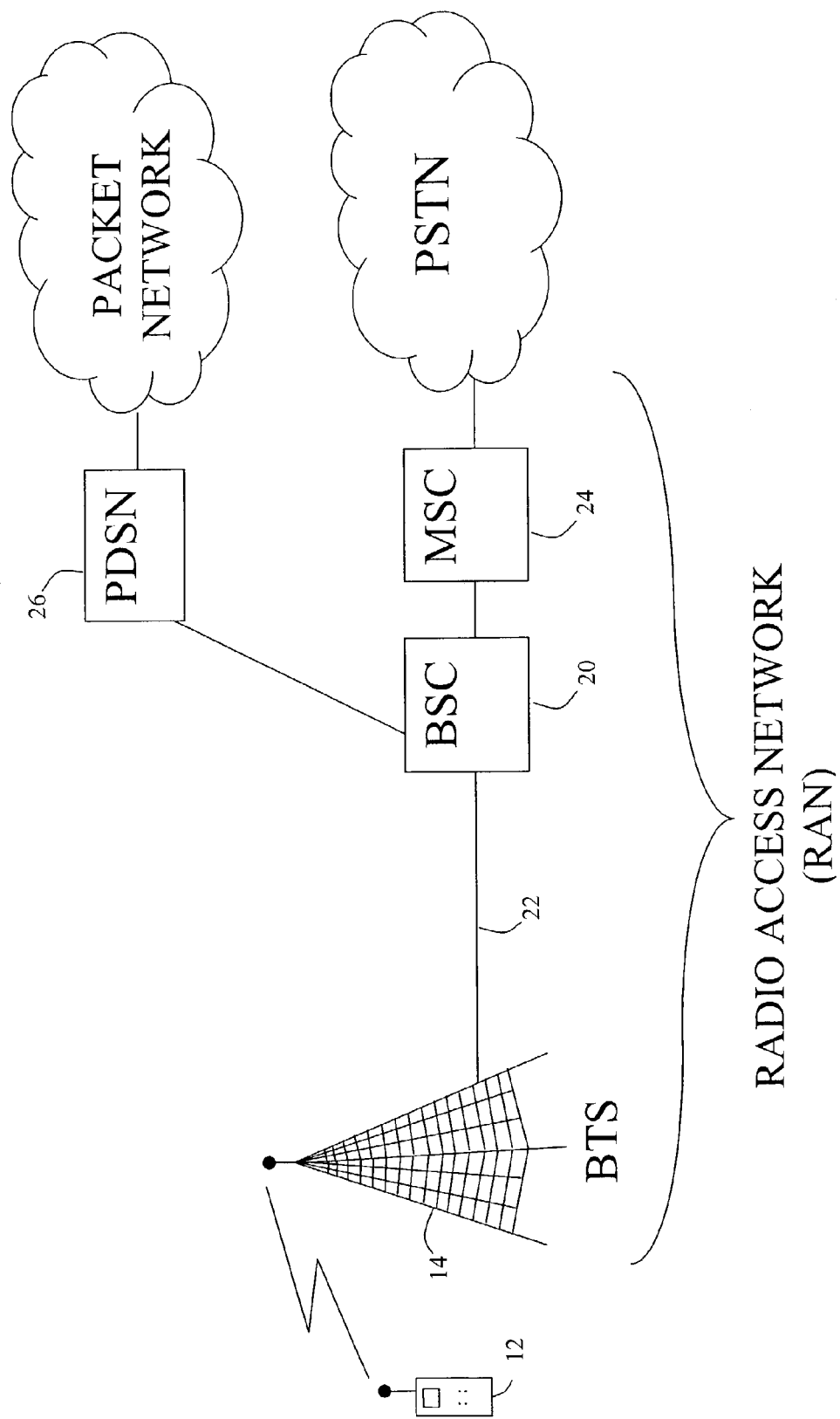
FIG. 1 is a simplified block diagram illustrating a portion of a telecommunications network in which an exemplary embodiment of the present invention can be implemented.

One example of a wireless network is shown in FIG. 1, which illustrates a simplified block diagram of a telecommunications network where an exemplary embodiment of the present invention may be employed. In this regard, it should be understood that many of the elements described and illustrated throughout this specification are functional in nature and may be embodied in one or more physical entities or may take other forms beyond those described or depicted. Alternatively, physical entities may be characterized with an equivalent functional description.

As shown in FIG. 1, the network may include a radio access network (RAN) that comprises various network nodes, such as a base transceiver station (BTS) 14, a base station controller (BSC) 20, and a common gateway such as mobile switching center (MSC) 24 or a packet data serving node (PDSN) 26, such as a Commworks® Total Control 1000 Packet Data Serving Node or the like. MSC 24 may be a Motorola or Nortel MSC or any other suitable MSC. The arrangement and functionality of these components are well known in the art and therefore will not be described here in detail.

MSC 24 may serve as an interface between BSC 20 and the public switched telephone network (PSTN) 28. Similarly, PDSN 26 may serve as an interface between BSC 20 and an IP network 30, such as a mobile internet or the Internet. It is not necessary that BSC 20 and MSC 24 be separate entities, since the functionality of both a BSC and an MSC could be integrated into one unit.

Within the telecommunications network, multiple communications devices, such as mobile station 12, may be communicatively coupled with BTS 14. Although mobile station 12 is shown as a wireless telephone, it may take any suitable form, such as (without limitation) a wireless modem, a wireless PDA, or a two-way pager. Mobile station 12 may communicate with BTS 14 using an air interface as set forth in TIA/EIA-95 or TIA/EIA/IS-2000. Alternatively, mobile station 12 could be part of a cellular system that uses another technology, such as AMPS, TDMA, DECT, GSM, PCS, or PWT; the cellular technology used is not necessarily critical to the functioning of the present invention.

For clarity only, multiple network entities, such as BTSs and BSCs, have been omitted from the drawings, although normally a network in which the invention may be implemented would include, for example, more than one BTS, MSC, mobile station, etc.

Typically, BTS 14 would be communicatively linked to BSC 20 via a first communication link such as a dedicated, circuit-switched transmission line, shown as transmission line 22 in FIG. 1. Transmission line 22 could be (or could include, without limitation), a copper wire, a fiber optic link, or a microwave link.

One of the problems with transmissions in networks, such as the network shown in FIG. 1, is a phenomenon called fading. In this regard, it is known that fading can arise from various obstructions in the signal paths between the mobile station and the base station. Additionally, fading may be caused by destructive interference due to intra-system multipath signals combining at various locations, which may result in the individual multi-path signals effectively canceling or subtracting each other. Fading may also be caused by inter-system multipath interference, on-channel interference, co-channel interference, Rayleigh fading, and intra system interference, or by propagation attenuation variations, path loss, delay-spread, obstructions, diffraction, refraction, and terrain absorption, for example. Other factors affecting fading may be the relative vertical and horizontal antenna height, distance and orientation between the mobile station antenna and the base station antenna. Advantageously, diversity transmission from the mobile station can help compensate for, or reduce, the effects of fading.

Diversity transmission from the mobile station may compensate for the effects of pathloss fading and destructive multi-path interference by sending two or more signals. In particular, multipath interference and pathloss fading generally follow a periodic peak (relatively high signal strength) and null (relatively low signal strength) radiation pattern proportional to the wavelength. These radiation patterns may be related to the addition and subtraction of different multipath signals, also known as constructive and destructive interference. For example, a user traveling may result in the base station being at a signal null; thus, the base station may experience fading due to destructive interference. And, a user traveling may result in the base station being at a signal peak; thus, the base station may receive a relatively strong signal due to constructive interference.

Figure 2:
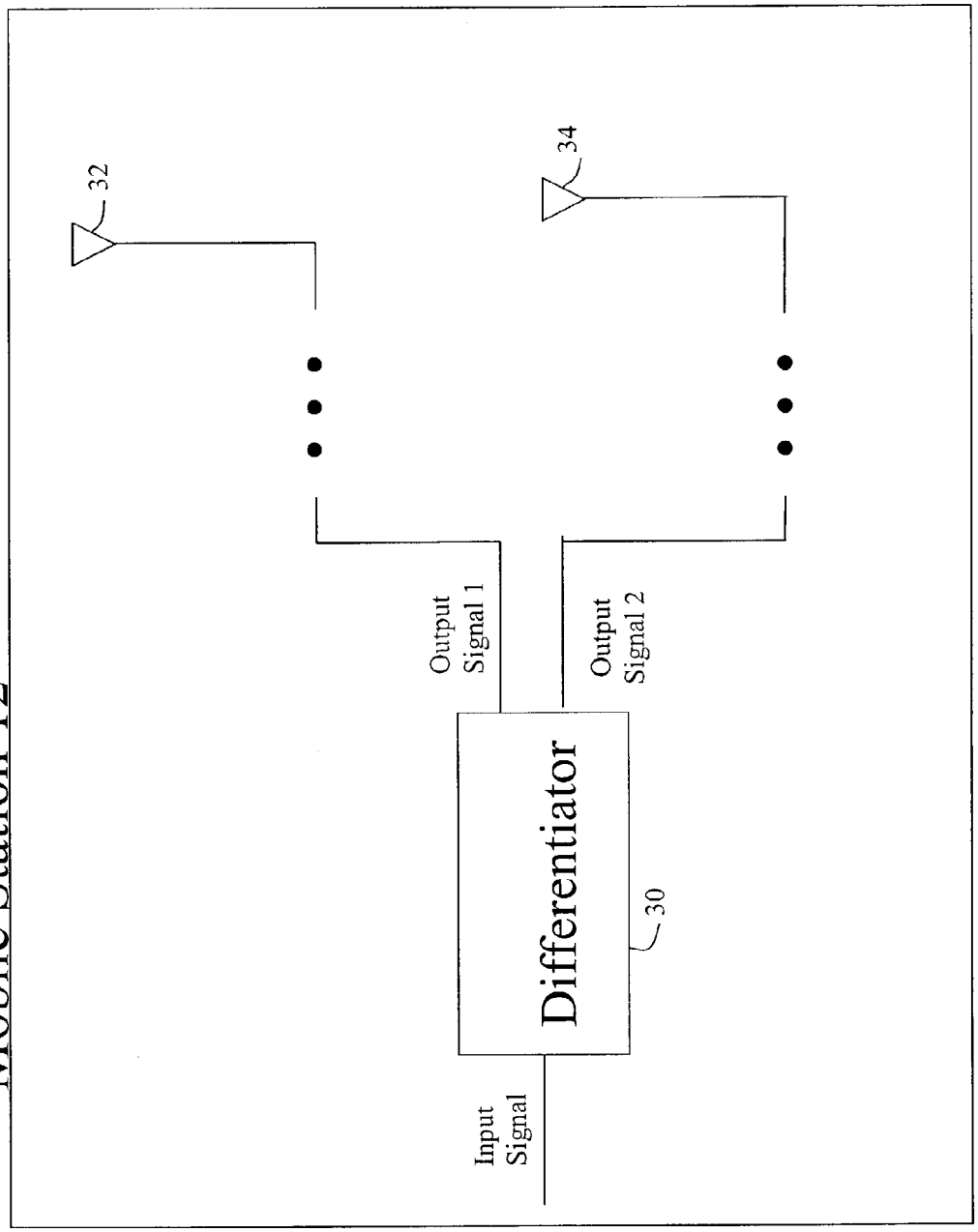
FIG. 2 is a simplified block diagram of a mobile station with a differentiator and two antennas in accordance with an exemplary embodiment.

Referring to FIG. 2, there is shown a simplified block diagram of a mobile station with a differentiator 30 and two antennas 32, 34 in accordance with an exemplary embodiment. The differentiator 30 has, as an input, an input signal, and as outputs, output signal 1 and output signal 2. Output signal 1 is in electrical communication with antenna 32 and output signal 2 is in electrical communication with antenna 34. In an exemplary embodiment, other electrical components, such as duplexers as shown in FIG. 4, may be connected between the output signals and the antennas. Alternatively, the output signals may be directly connected to the antennas 32, 34.

Figure 3:
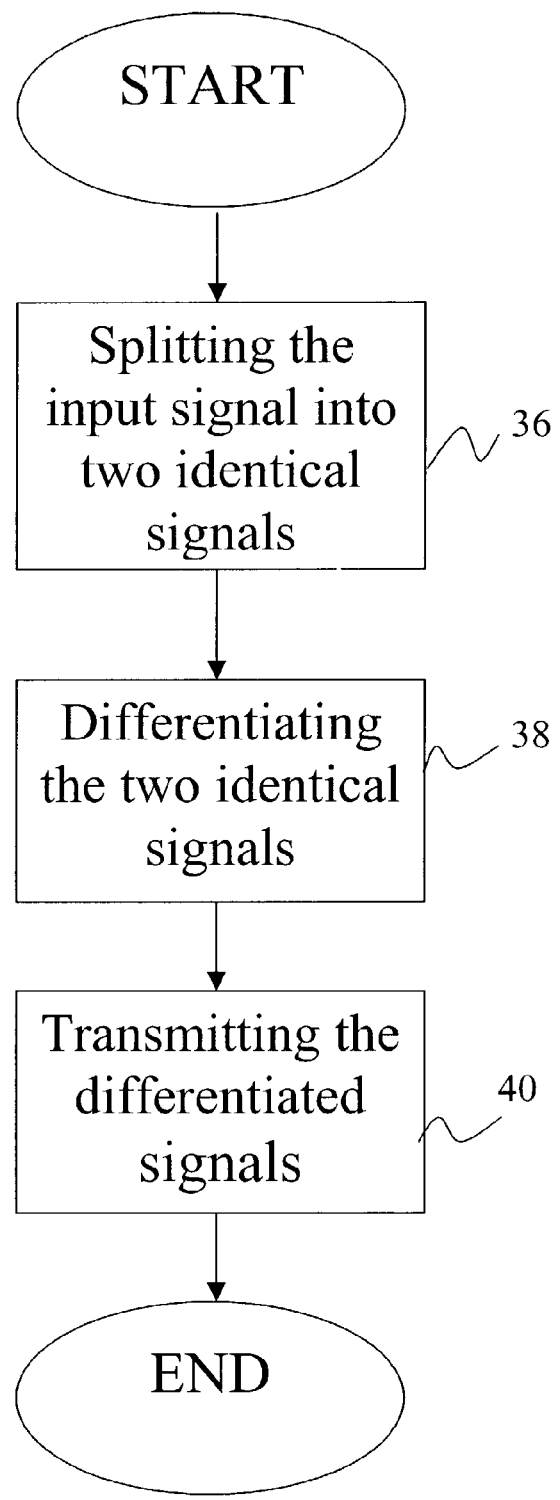
FIG. 3 is a flow chart illustrating an exemplary method of diversity transmission.

Referring to FIG. 3, there is shown a flow chart illustrating an exemplary method of diversity transmission. As shown at block 36 of FIG. 3, the differentiator splits the input signal into two identical signals (split signal 1 and split signal 2), which are identical to the input signal. As shown at block 38, the differentiator differentiates, or makes a distinction, between split signal 1 and split signal 2 to produce output signal 1 and output signal 2. One example of a distinction between split signal 1 and split signal 2 is a difference in phase between split signal 1 and split signal 2, as discussed subsequently with respect to FIG. 4. Split signal 1 and/or split signal 2 may be modified so that, when comparing output signal 1 with output signal 2, the output signals differ in phase (such as a difference of a phase constant). For example, to differentiate output signal 1 and output signal 2, only the phase of split signal 1 may be modified. The phase of split signal 1 is changed to produce the output signal 1. Since split signal 2 is unmodified, the output signal 2 is identical to the split signal 2 (which is identical to the input signal). In this manner, when comparing output signal 1 with output signal 2, the signals differ only in phase. Alternatively, to differentiate output signal 1 from output signal 2, only the phase of the split signal 2 may be modified. Specifically, the phase of split signal 2 is changed to produce the output signal 2. Since split signal 1 is unmodified, output signal 1 is identical to split signal 1 (which is identical to the input signal). In this manner, when comparing output signal 1 with output signal 2, the signals differ only in phase. In still an alternate embodiment, to differentiate output signal 1 from output signal 2, the phase of both split signal 1 and split signal 2 may be modified. For example, the phase of split signal 1 may changed by a first phase constant to produce output signal 1 and the phase of the split signal 2 may be changed by a second phase constant to produce output signal 2. Output signal 1 and output signal 2 thus differ in phase (as long as the first phase constant is not equal to the second phase constant). Similarly, another example of a distinction between split signal 1 and split signal 2 is a difference in time between split signal 1 and split signal 2, as discussed subsequently with respect to FIG. 3. After differentiating the first and second split signals, output signal 1 is transmitted from antenna 32 and output signal 2 is transmitted from antenna 34, as shown at block 40 of FIG. 3.

The input signal may be split and differentiated at any point within the mobile station prior to transmission. In an exemplary embodiment, the input signal may be split and differentiated as an analog signal. As discussed in more detail with respect to FIG. 4, the input signal may be split and differentiated when the input signal is an RF signal. Alternatively, the input signal may be split and differentiated as a digital signal. For example, the input digital signal may be split and differentiated. The differentiated signals may then be converted to an analog signal, and then up-converted, by using separate up-converters, to an RF signal.

Figure 4A:
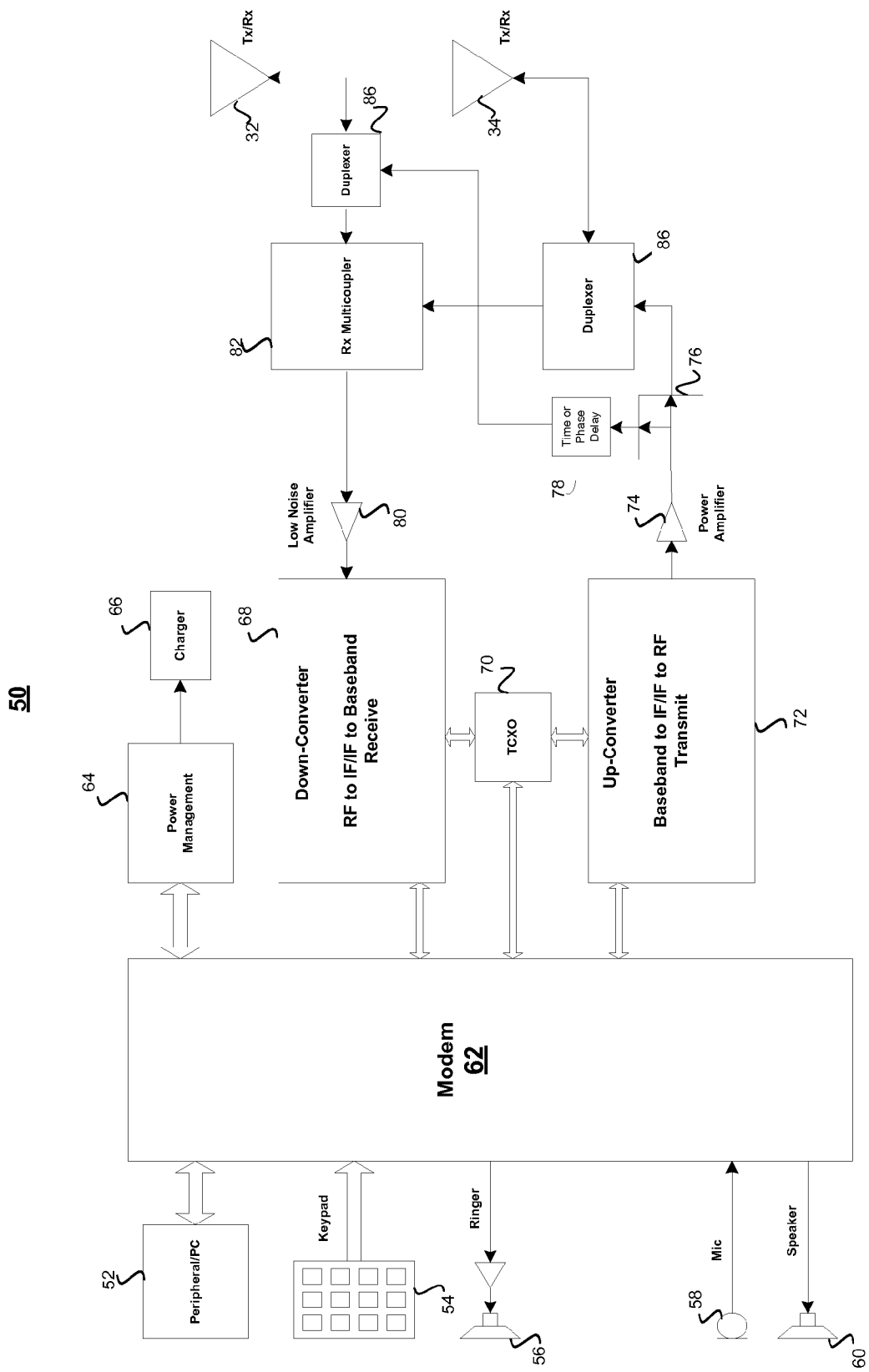
FIGS. 4A-4B are block diagrams of mobile station transceivers splitting and differentiating the RF signal in accordance with an exemplary embodiment.

Referring to FIG. 4A, there is shown a block diagram of a mobile station transceiver 50 splitting and differentiating the RF signal in accordance with an exemplary embodiment. The transceiver 50 includes, in an exemplary embodiment, a processor, such as modem 62. In one aspect, the modem may be a digital signal processor (DSP). The modem 62 may have peripheral connection(s) 52 to external devices such as a speakerphone or a personal computer. Further, to facilitate the functionality of the mobile station 12, the modem communicates with a keypad 54, ringer 56, microphone 58, and speaker 60. Power for the mobile station 12 is managed by power management 64, which is electrically connected to charger 66, for charging the power supply.

In an exemplary embodiment, modem 62 processes base band signals. The base band signals are converted to higher frequencies using up-converter 72. For example, up converter 72 may convert the base band signal to an intermediate frequency (IF) signal and then to an RF signal suitable for transmission by antennas 32, 34. Alternatively, for example, the up-converter 72 may also convert the base band signal from the base band processor/modem 62 directly to an RF signal without using an IF. The transceiver 50 may further include a down-converter 68. The down-converter 68 may convert the RF signal to an IF signal for processing by the base band processor/modem 62. The modem 62, up-converter 72 and down-converter 68 may access a constant frequency source, such as a crystal (TCXO) 70.

Figure 4B:
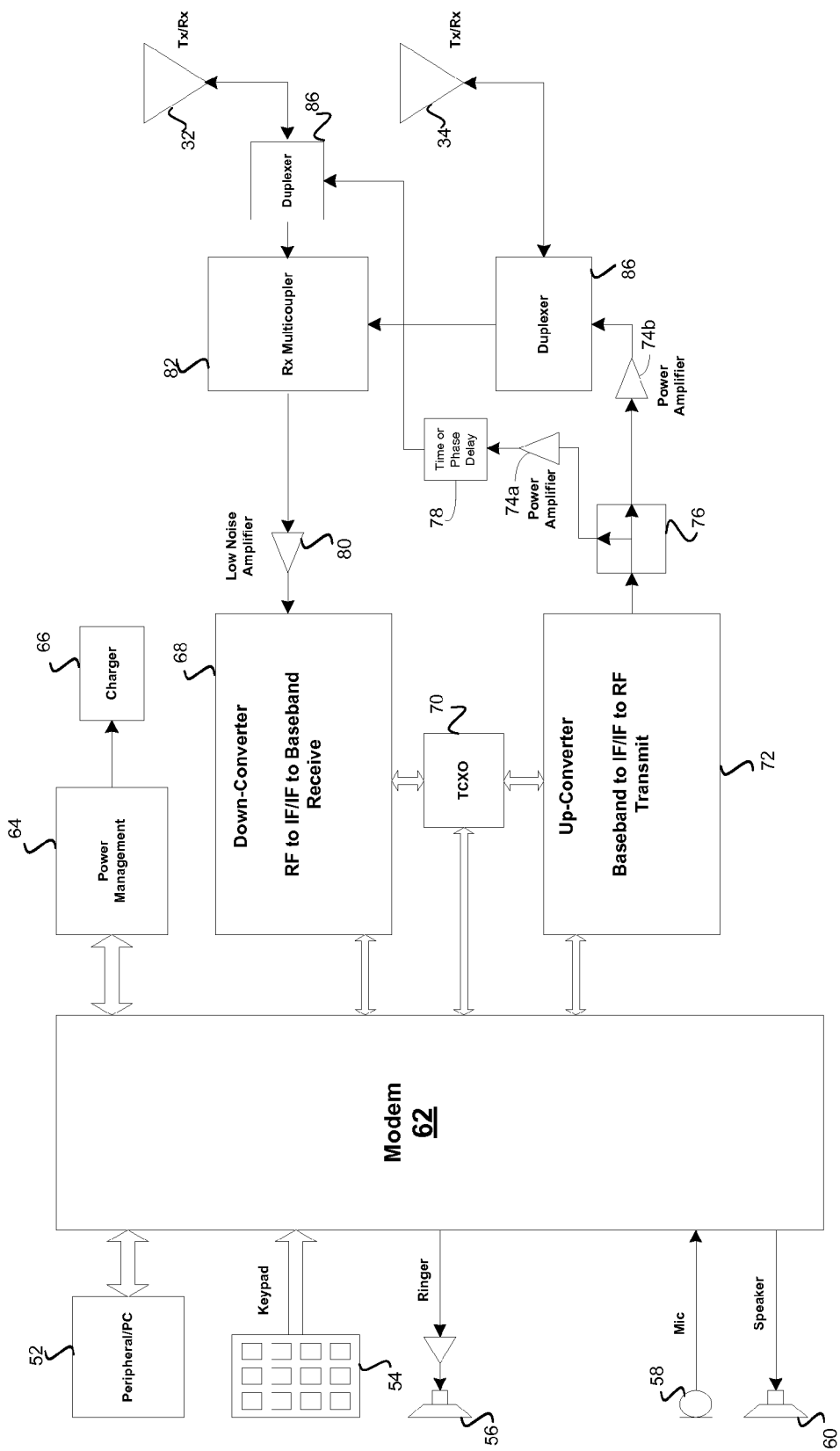

As discussed above, the output of the up-converter 72 is an RF signal. This RF signal may be split and differentiated, as discussed with respect to FIG. 2. Since the signal is split into two identical signals, the power for the identical signals is 50% less than the signal input to splitter 76. In order to compensate for the reduction in power, the output RF signal from up-converter 72 is input to power amplifier 74. Power amplifier 74 amplifies the RF signal. In an exemplary embodiment, power amplifier amplifies the RF signal by +3 dB. This doubles the power of the RF signal, thus compensating for the reduction in power from splitter 76. Alternatively, the signals may be amplified after the splitting of the signal, as shown in FIG. 4B. For example, a power amplifier 74a may be placed between splitter 76 and time or phase delay 78 and a power amplifier 74b may be placed between splitter 76 and duplexer 84. In this arrangement, the time or phase delay 78 is still in electrical communication with splitter 76 via a power amplifier.

Splitter 76 has as its input the output of power amplifier 74. Splitter 76 further has at least two outputs. A splitter should typically match the impedance of the input line and should not affect the signal being split at the frequency of interest. In the exemplary embodiment shown in FIG. 4, Splitter 76 may be composed of a "Y" splitter, chosen to match the impedance to the output of the power amplifier and not affect signals in the RF band.

One output of splitter 76 is connected to the input of time or phase delay 78. Time or phase delay 78 acts to differentiate the signals split from splitter 76. For a constant phase shift, time or phase delay 78 typically is a passive component which, for the frequency band of interest, has a linear phase change and a flat magnitude response. Time or phase delay 78 may be composed of a transmission line, such as a microstrip transmission line, with the split signal being input to the transmission line and the output being taken at any point on the transmission line (such as via a tap), depending on how much phase delay is desired. Alternatively, time or phase delay 78 may be composed of a tuning stub which may introduce a specific phase variation to a signal.

The output of time or phase delay 78 is sent to duplexer 86. As shown in FIG. 4, antennas 32, 34 receive and transmit signals (Tx/Rx). To facilitate transmitting and receiving on a single antenna, such as antenna 32 or antenna 34, a bi-directional coupler, such as duplexer 84 or duplexer 86 may be used. In an exemplary embodiment, duplexers 84, 86 have a transmit band filter in order to permit the transmitted signals (either from time or phase delay 78 or splitter 76) to pass through the duplexers 84, 86 and to the duplexed antennas 32, 34. Analogously, the duplexers 84, 86 have a receive filter in order to permit the received signals to pass from the duplexed antennas 32, 34 through the duplexers 84, 86 to Rx Multicoupler 82.

Alternatively, rather than having a duplexer, a device such as circulator, or switch, may permit a single antenna 32, 34 respectively to function as both a transmit and a receive antenna. Since many protocols use digital modulation, the transmit and receive periods may occur at non-overlapping time periods. Accordingly, TDMA protocols such as GSM, IS-54, and IEEE 802.11, permit a single antenna 32, 34 to perform the transmit and receive functions without the need for a separate transmit antenna or a combiner/duplexer. Since the receive and transmit functions may occur in non-overlapping periods of time, or modes, and since two or more non-overlapping receive samples may be made in these systems during the receive period, a single antenna may provide the function of both transmit and receive diversity. Alternatively, a switch may be used in place of a duplexer in order to permit a single receive/transmit antenna 32, 34 when in a receive mode.

Rx Multicoupler 82 sends its output to a low noise amplifier 80. The output of amplifier 80 is sent to down-converter 68. By way of example, two signals may be received by antennas 32, 34. If one of the two signals suffers from fading or interference, then, statistically, the remaining signal likely will be a stronger signal. Accordingly, the receiver may then switch between the two receive signals in order to select the stronger of the two signals to be received. For example, Rx Multicoupler 82 may facilitate switching between the two received signals. Alternatively, one embodiment of Rx Multicoupler 82 is a max-ratio type of combiner. Accordingly, the receiver may combine the two received signals, for example, with a maximum-ratio type of Rx Multicoupler 82 in order to provide a combined signal that is stronger than either of the two signals individually.

Figure 5:
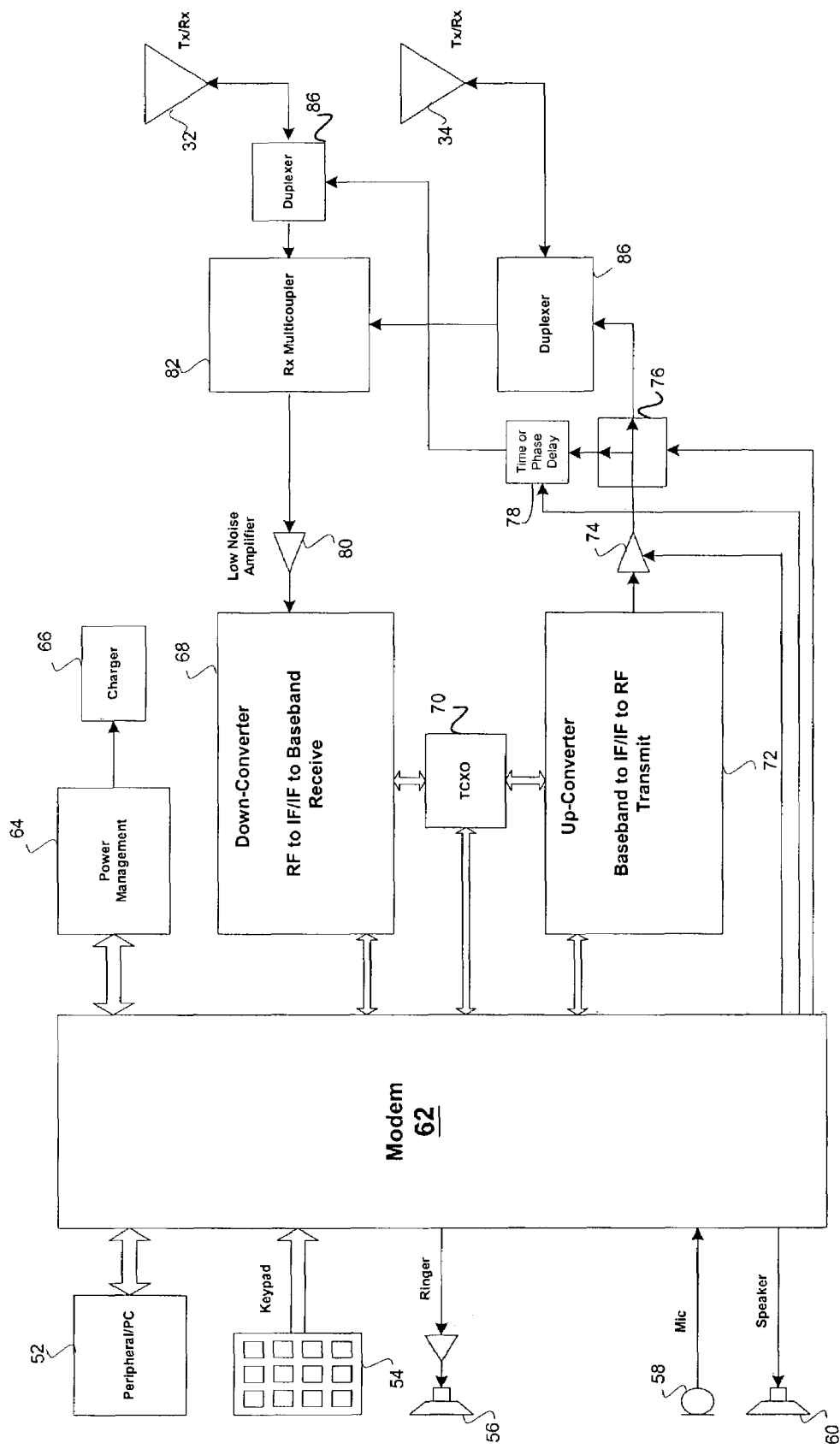
FIG. 5 is a block diagram of a mobile station transceiver splitting and differentiating the RF signal in accordance with another exemplary embodiment.

FIG. 4 illustrates a transceiver 50 with constant power amplification for the transmitted signals (with amplifier 74) and constant splitting/diversifying of the signals (with splitter 76 and time or phase delay 78). Alternatively, the power levels of the transmitted signals may vary, as shown in FIG. 5. Power in the mobile station 12 is typically limited by a battery supply. To control the power used, the amount of amplification may be modified. Power amplifier 74 may include an additional input from modem 62, as shown in FIG. 5, to control the amount of amplification of the input RF signal. To conserve power, the amplification by power amplifier 74 may be reduced. Alternatively, if the base transceiver station 14 is unable to decipher the signal, the amplification by power amplifier 74 may be increased. Moreover, to conserve power, diversity transmission may be disabled. As shown in FIG. 5, splitter 76 may include an additional input from modem 62. In this manner, modem 62 may control splitter 76 so that only one output is produced from splitter 76. The modem 62 may disable diversity transmission based on predetermined programming. For example, diversity transmission may be disabled based on a preprogrammed sequence in modem 62. The preprogrammed sequence may be based either on constant time periods or dynamic time periods. Alternatively, diversity transmission may be disabled based on the need for diversity transmission. If diversity transmission is unnecessary (such as in a very flat area where transmitted signals are unobstructed), the modem may disable diversity transmission. Modem 62 may determine whether diversity transmission is necessary based on determining whether diversity reception is necessary. If diversity reception is unnecessary (there is no need to switch to the second signal received), the diversity transmission may be disabled. In still an alternate embodiment, diversity transmission may be disabled based on control from the base station transceiver 14. The base station transceiver 14 may send a command which is interpreted by modem 62 to disable diversity transmission.

In a further alternate embodiment, the amount of differentiation of the signals may be controlled, as shown in FIG. 5. Time or phase delay 78 may include an input from modem 62 in order to modify the amount of phase or time delay of the signals. When using a microstrip transmission line, taps may be placed at different points in the transmission line. The output signal may be sent from different taps in the transmission line depending on control from modem to modify the amount of phase delay.

Exemplary embodiments of the invention have been described above. Those skilled in the art will understand, however, that changes and modifications may be made to these embodiments without departing from the true scope and spirit of the present invention, which is defined by the claims.

For example, a variety of air interface protocols may be used, including CDMA, 3G, and hybrid CDMA/TDMA air interface protocols. Additionally, the standards being developed for future protocols may utilize various hybrid forms of CDMA/TDMA, so these standard and future cellular air interface protocols are contemplated. The claims should not be read as limited to the described order or elements unless stated to that effect.

I claim:

1. A mobile station comprising:
   a transmitter for generating a transmit signal;
   a splitter for splitting the transmit signal into two signals, the splitter being coupled to the transmitter;
   a modem for determining whether diversity transmission is necessary, and if not, for disabling the splitter so that the transmit signal is not split into two signals;
   a power amplifier for amplifying each of the two signals;
   a transmit signal differentiator for differentiating the two amplified signals into a first differentiated signal and a second differentiated signal, the transmit signal differentiator in electrical communication with the splitter;
   a first antenna for transmitting the first differentiated signal; and
   a second antenna for transmitting the second differentiated signal.

2. The mobile station of claim 1, wherein the transmit signal differentiator delays at least one of the two signals.

3. The mobile station of claim 2, wherein the transmit signal differentiator delays only one of the two signals.

4. The mobile station of claim 1, wherein the transmit signal differentiator modifies a phase of at least one of the two signals.

5. The mobile station of claim 4, wherein the transmit signal differentiator modifies the phase of only one of the two signals.

6. The mobile station of claim 1,
   wherein the first antenna receives incoming signals,
   wherein the second antenna receives incoming signals,
   further comprising a first duplexer coupled between the transmit signal differentiator and the first antenna, and
   further comprising a second duplexer coupled between the splitter and the second antenna.

7. The mobile station of claim 1, wherein if diversity transmission is deemed unnecessary, the splitter outputs one transmit signal.

* * * * *